United States Patent [19]

Kahle

[11] 4,161,363
[45] Jul. 17, 1979

[54] INSTANTANEOUS EXPOSURE CONTROL FOR FILM

[75] Inventor: Rolf D. Kahle, Saratoga, Calif.

[73] Assignee: Quantor Corporation, Mountain View, Calif.

[21] Appl. No.: 601,756

[22] Filed: Aug. 4, 1975

[51] Int. Cl.² ............... G03B 27/74; G03B 27/78
[52] U.S. Cl. ............................ 355/68; 355/69; 355/77; 355/83
[58] Field of Search ............... 96/27 E, 38.4, 49; 355/68, 69, 83, 77

[56] References Cited

U.S. PATENT DOCUMENTS

| 3,077,401 | 2/1963 | Grinten et al. | 355/83 |
| 3,426,357 | 2/1969 | Paulus | 355/83 |
| 3,790,789 | 2/1974 | Takahashi et al. | 355/68 |

Primary Examiner—Russell E. Adams
Attorney, Agent, or Firm—Townsend and Townsend

[57] ABSTRACT

The exposure of film which changes its transmissivity as a function of the quantum of light to which it is subjected is controlled by sensing the intensity of the light transmitted through the film. From the sensed light the change in the light transmissivity of the film is determined and when that change has reached the desired level the exposure of the film is terminated. The exposure is instantaneously controlled and terminated only after the desired exposure level has been reached irrespective of the time required.

20 Claims, 3 Drawing Figures

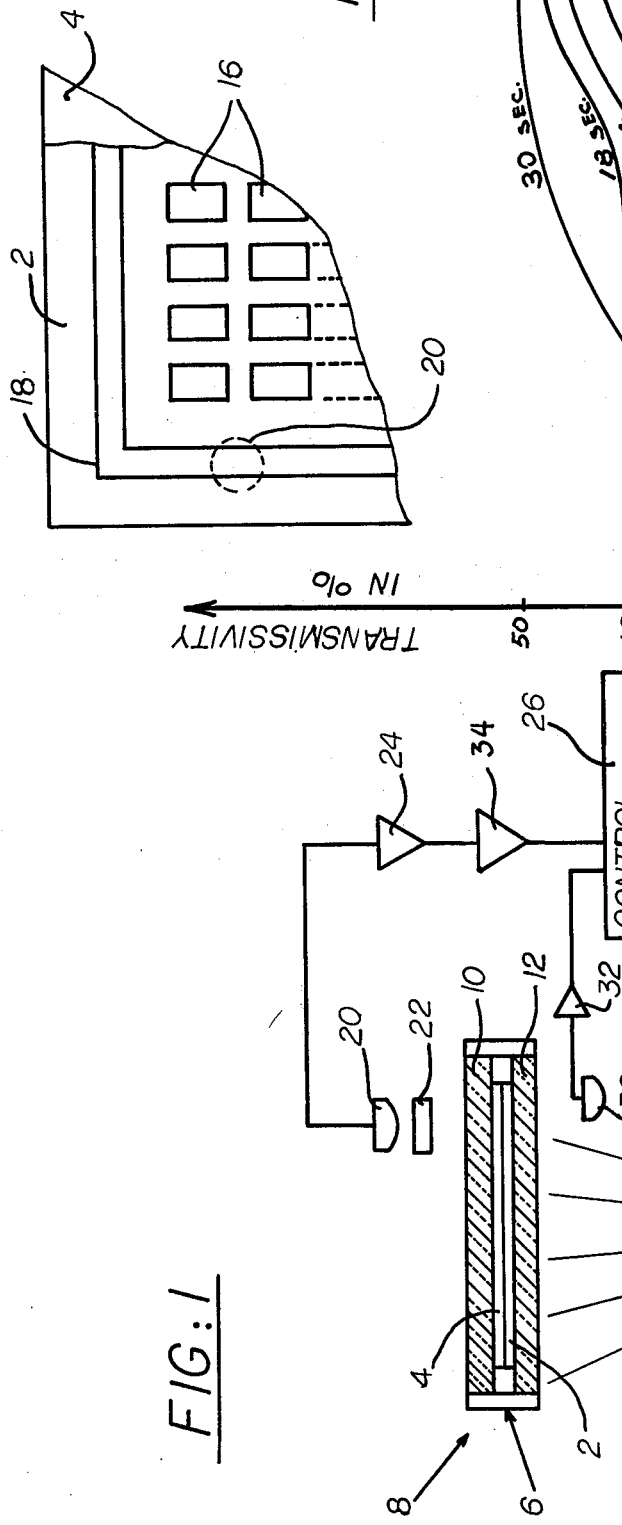
FIG:1
FIG:2
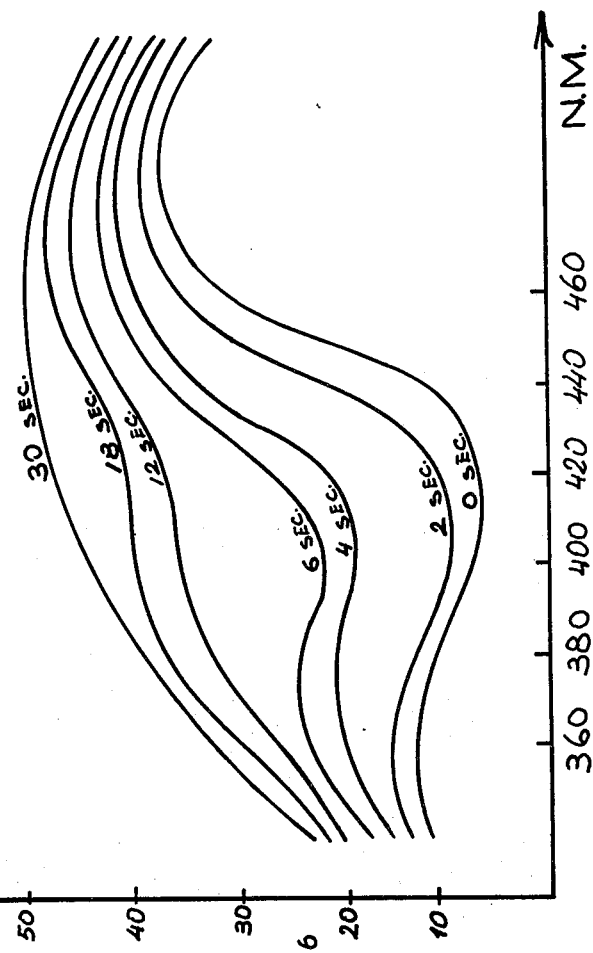
FIG:3

INSTANTANEOUS EXPOSURE CONTROL FOR FILM

BACKGROUND OF THE INVENTION

This invention relates to an instantaneous exposure control for light sensitive films by terminating the exposure after the light sensitive substance on the film has been subjected to the quantum of light which will yield the desired film contrast levels without regard to the actual exposure times, light source intensities, etc.

When photographic images are made the quality of the image is determined by its sharpness, which is the function of the optics and their proper adjustment, and by the amount of light to which the film is exposed. The latter primarily determined the contrast, namely, the density or blackness and the transparency of certain portions of the film and intermediate gray scales of other portions of the film. Each film has an optimal exposure value, which for convenience, can be called an optimal quantity of light to which it is exposed. Insufficient or excess exposure will reduce the quality of the image and, therefore, of the finished film.

One particularly critical application of photographic film is in the area of high speed, large volume duplication of photographic records, such as records stored on microfiche masters which is to be transferred onto microfiche copies or copy film. For a number of reasons, such as its greater resolution, versatility, storing qualities, etc. vesicular film is used in an ever increasing amount for such applications.

To briefly summarize the characteristics of vesicular film, light sensitive diazonium salt is uniformly disposed in a thin thermoplastic resin layer carried by a conventional transparent substrate. Upon exposure to light, particularly ultraviolet radiation, the diazonium salt decomposes and releases nitrogen and other volatile fragments which collect in small nucleating centers. Upon subsequent heating, the nuclei expand to form microscopic vesicles or bubbles which scatter incident light and thus form an image. The heating step is analogous to the developing of conventional silver film.

Vesicular film copies are normally made by contact printing the copy film from a microfiche master, that is by placing the copy film into intimate contact with the master film and directing light from a light source through the master onto the copy film. In the past, actual exposure times were determined by trial and error. First, the exposure times were set by experiences, that is the operator sets the exposure time to what he believed would yield a copy fiche with the desired image density or blackness. After the first copy had been made it was inspected and if it was too light or too dark the exposure time was suitably adjusted until the desired image quality was attained.

This system is time-consuming, can waste a substantial amount of expensive film and still permits a fair amount of deviation based on the operator's subjective impressions, observations and his interpretation of what the image should look like. However, since the copies are frequently used on sensitive equipment, image uniformity is highly desirable.

In addition, the prior art approach of relying on the operator's judgment to obtain optimal exposure control does not take into account variations in the film exposure due to changes in the light intensity from such factors as changes in the line voltage, reflector contamination, lamp aging, etc., changes in the light sensitivity of different copy film batches, base and fog variations of the master film, and the like. Nevertheless, such changes and variations affect the quantum of light that reaches the copy film during a given time interval, or the quantum of light required for exposing the copy film to the desired level. Thus, unless the copies are constantly monitored, which is frequently impossible due to the high copy volume, the quality of the copy film can at best be maintained within a more or less acceptable range, but not at peak value.

SUMMARY OF THE PRESENT INVENTION

The present invention employs the fact that the diazonium salt in the light sensitive layer of vesicular film decomposes as it is exposed to light as a function of the quantum of light to which it is exposed. The decomposition of the salt increases the transmittance or transmissivity of the light sensitive layer and therewith of the film. The change in the transmissivity of the film reflects the degree of diazonium salt decomposition with a high degree of accuracy. It is therefore a relatively accurate measurement of the degree of exposure. Although the present invention is primarily described as used in conjunction with vesicular film, it is equally applicable to any other film which changes its transmissivity as a function of the quantum of light to which it is exposed.

Unexposed vesicular film has a light transmissivity of about 10% at its peak sensitivity of the spectrum, normally in the vicinity of 400 nanometers (nm). With exposure of the light sensitive substance to light the transmissivity increases to a maximum or terminal value of about 40% to 50%, a four-to-five fold increase over that of unexposed film. This characteristic has been found to be present in all known, commercially available vesicular films such as that made by the Xidex Corporation of Sunnyvale, Calif., the Kalvar Corporation of New Orleans, La., and the Photomedia Corporation of Los Angeles, Calif.

The present invention makes it possible to instantaneously determine the degree of exposure of the light sensitive substance of a film by simply measuring the transmitted light as the film is being exposed. As the transmittance, or the intensity of the transmitted light increases exposure progresses. Terminal exposure is reached with the above-mentioned commercially available vesicular films when the transmissivity has increased by a factor of about four-to-five. Once the desired increase in the transmissivity of the film is detected the exposure is terminated. Typically, the exposure is terminated at a point less than the film's terminal or maximum transmissivity, say when the transmissivity has increased by a factor of 2 to 3.

The exposure control of the present invention is independent of such extraneous influences as changes in the light intensity from the light source, reflector or glass contaminations or even changes in the light sensitivity of different film batches. The film is simply exposed for as long or as short as it takes to reach its peak or terminal transmissivity, or whatever lesser value is chosen. The moment the desired transmissivity is reached the exposure is terminated. So-called dry runs, sample copies, subjective evaluations of the film quality, etc. which were necessary mainstays of prior art film exposure quality control are eliminated. Furthermore, changes of the exposure parameters are instantaneously detected and compensated for and need not wait for a perchance detection before corrective action is taken. The present invention, therefore, greatly enhances the quality of exposed film.

More specifically, the present invention contemplates a system wherein a holder mounts a copy film in intimate contact to a master located between a light source and a light sensor. The master has a clear or transparent control area, such as a clear film border, with which the sensor is aligned. The sensor has a linear light to output signal characteristic and a spectral response which is the same as or approximates that of the film itself. In the case of vesicular film, the spectral response of the sensor should be in the area of 380 to about 440 nanometers with a peak response in the area of the film's peak sensitivity. A narrow band filter may be interposed.

The sensor measures the change in the transmissivity of the copy film from the time at which the light exposure commences. The output signal from the sensor is proportionally amplified by an amplifier and electrical control circuitry is provided which determines the change in the transmissivity of the copy film and which terminates the film exposure, by closing a shutter or by turning off the light, for example, when the desired degree of exposure has been reached. In one form of the invention, the control circuit is a conventional sample and hold circuit which determines the ratio between the original (amplified) output signal of the sensor and the subsequent output signals. When the ratio has reached the desired value the control circuit terminates the film exposure. Since the sensor determines the change in the transmissivity from the sensor's output signal ratio any changes in the light sensitivity, long-term line voltage variations, etc. are automatically compensated for since it will correspondingly change the exposure time of the film.

Another aspect of the invention is capable of compensating for line voltage variations (and corresponding light intensity changes) which may take place during an exposure cycle. If such capability is desired a second light sensor is positioned in the direct light path (e.g. on the side of the film facing the light source). The outputs of the two sensors are then continuously compared, for example in a conventional comparator circuit, and when the desired signal ratio has been detected the exposure is terminated. In this manner, the changes in the light intensity from the source during an exposure cycle are compensated for and cannot adversely affect the exposure of the film. Since exposure times are short, normally only a few seconds, light intensity variations during the exposure cycle are negligible and the provision of the second sensor is therefore not normally required.

In another form of the invention the amplified output signal of the sensor is integrated and the integrated signal is fed to a comparator. A reference signal generated by a potentiometer is applied to the comparator and when the integrated and the reference signals have reached predetermined relative values, say are equal, the film exposure is terminated. This embodiment of the invention terminates the film exposure as a function of the total light sensed by the photo-sensor over the exposure cycle rather than as a function of the light intensity alone. However, since the photo-sensor is on the side of the copy film opposite the light source the change in the light transmissivity of the film is taken into account because with an increasing light transmissivity of the film the length of time for the transmission of a predetermined light quantum (as determined by the setting of the potentiometer) is shortened proportional to the increase in the light transmissivity. Therefore, this form of the invention also, though indirectly measures or determines the change in light transmissivity that has occurred in the film. Of course, the comparator is set so that the exposure is terminated when the light transmissivity of the film has increased by the desired amount, say by a factor of 2 or 3 as above-described.

The last described form of the invention is advantageous in that the support electronics are simpler and more economical to construct. Furthermore, the integrated signal is inherently insensitive to background light or noise. A high background light or noise sensitivity of a signal can adversely affect the point at which exposure is terminated and can make it necessary to carefully screen out background light and/or noise which in turn can increase the cost of the installation.

DESCRIPTION OF THE DRAWINGS

FIG. 1 is a schematic illustration of the instantaneous exposure control system of the present invention.

FIG. 2 is a fragmentary plan view of a master film and a copy film in face-to-face contact for contact printing;

FIG. 3 is a diagram illustrating the change in transmissivity of vesicular film exposed to light for various time periods and illustrates variations in the transmissivity change at different spectral points of the film.

DESCRIPTION OF THE PREFERRED EMBODIMENTS

Referring to the drawings, a master fiche or film 2 is in intimate, face-to-face contact with a copy fiche or film 4. Both are held by a holder 6 defining a copy station 8 and transparent platens 10, 12 are biased against each other to maintain the film sections in intimate contact. A light source 14, such as a pulsating gas discharge lamp or an incandescent lamp directs light perpendicular to the holder first through master film 2 and then through copy film 4.

The master film is a photography, say of a multiplicity of data units 16, each data being a photograph of a computer printout sheet, for example, which are arranged in rows and columns as is conventional so that any of the data units can be readily retrieved with suitable reading apparatus (not shown). The master film includes a transparent control area, such as a transparent border strip 18 through which light from source 14 can pass.

A light sensor 20 is positioned on the side of holder 6 opposite the light source and aligned with transparent border strip 18 of the master. Any light from the source which passes through the border strip and which is transmitted by copy film 4 is detected by the sensor. The sensor generates output signals which are a function of the intensity of the sensed light. In a presently preferred embodiment of the invention, in which copy film 4 comprises vesicular film which has a peak transmissivity in the vicinity of about 405 nm, the sensor comprises a silicon sensor element which exhibits excellent stability and emits output signals which are a linear function of the sensed light intensity. Such a sensor is sold, for example, by the Semi-Conductor Division of International Rectifier, 233 Kansas St., El Segundo, Calif. 90245. A stable, narrow band spectral glass filter 22 is positioned forward of the sensor 20 to limit the light received by the sensor to that in the range of optimal light transmissivity of the vesicular copy film, say in the range of about 380 to 430 nm.

An amplifier 24 linearly amplifies the signals received from sensor 20 and feeds them to a control circuit 26 which, in one form of the invention, is a sample and hold circuit that compares the instantaneous output signal with an initial output signal until the signals have the desired ratio, say 2 or 3 to 1, or if desired, its terminal value. When the desired ratio is detected, after the change in the film's transmissivity has reached a predetermined level as determined by a corresponding increase in the sensed light intensity, the control circuit deactivates a power source 28 for light 14 to thereby terminate the exposure of the copy film.

For vesicular film, in which the transmissivity increases from about 10% at zero exposure to a maximum of about 40% to 50% (a ratio of 4:1 to 5:1), the control circuit is set so that the power source is deactivated when the amplified light sensor signal has increased by the desired factor, normally at least about two. The amplifier may be a variable gain amplifier so that the power source can be deactivated when the sensor signal reaches different levels by adjusting the gain correspondingly.

The use and operation of the exposure control system of the present invention should now be apparent. To summarize it, master film 2 and copy film 4 are positioned in holder 6 for contact bringing the images of the master on the copy film by directing light from source 14 through the master onto the copy film. This exposure causes a decomposition of the diazonium salts and after subsequent development, i.e. heating, bubbles are formed which scatter the light and form the image on the copy film.

Assuming the copy film to be Xidex Super-X vesicular film (available from the Xidex Corporation of Sunnyvale, Calif.), it has a peak sensitivity at about 405 nm and changes its light transmissivity as a function of its exposure to light as plotted in FIG. 3. FIG. 3 illustrates that the greatest change in transmissivity occurs in the vicinity of the film's peak sensitivity, i.e. at about 405 nm. The light sensor should therefore be selected so that its spectral response corresponds to a narrow spectral range in the vicinity of the peak sensitivity of the films. For Xidex Super-X vesicular film, the use of a silicon sensor in conjunction with a filter transmitting light in the spectral range of about 380 to 420 nm gives excellent results.

Light sensor 20 begins to sense the transmitted light as soon as source 14 is energized and it emits output signals which are a function of the light intensity sensed by it. As the exposure continues (and diazonium salt decomposes) the light transmissivity of the copy film increases (while the transmissivity of the transparent border strip 18 on master fiche 2 remains constant) which results in a corresponding increase in the light intensity sensed by the sensor and an increase in its output signals. This process continues until the output signals from the sensor indicate that the predetermined light transmissivity of the copy film has been reached. At this point the control circuit deactivates power source 28 and further exposure of the copy film ceases. The film is now ready for developing in a conventional manner.

The determination of the film exposure is a function of the quantum of light to which the copy film was subjected as detected by sensor 20 by determining the change in transmissivity from the ratio between the sensed light intensity with the initially measured light intensity. Thus, if the intensity of the light emitted by light source 14 has decreased, because of line voltage variations, lamp age, reflector or holder contamination, and the like the quantum of light received by the copy film per unit of time is correspondingly reduced. Accordingly, the transmissivity of the copy film changes at a reduced rate. Consequently, it will take more time until the desired level of transmissivity is reached and the film will be exposed for a longer period of time until it has been subjected to the desired quantum of light which will yield an optimal image upon development of the film. Similarly, if the sensitivity of the film changes so that it requires more or less light energy to reach the desired exposure level the rate with which the transmissivity changes will vary. However, the exposure control of the present invention will continue exposure until, and terminate it when the desired level has been reached irrespective of the time interval which is required to reach it. Base and fog variations in the master film are similarly compensated for by the exposure control of the present invention by continuing the exposure to light until the desired change in the ratio of the sensed light intensity, and therewith in the light, transmissivity of the copy film has been reached. When the vesicular film is fully exposed the exposed film portions will be fully opaque after developing even though the master exhibits base fog, that is slight opaqueness. Thus, the copy film can have a greater degree of contrast and a higher quality than the master.

In each instant the finished exposed copy film is of a constant high quality. The present invention attains this with an instantaneous exposure control of each and every copy film made instead of with the heretofore necessary subjective quality determination of samples only which necessarily leads to undesirable quality variations.

To obtain complete control over the exposure of the film, that is to compensate for light intensity variations during a given exposure cycle such as from short term line voltage variations, a second light sensor 30 can be positioned in the direct path of light from source 14. Output signals from the second sensor are amplified by a second amplifier 32 and fed to the control circuit 26 which comprises a conventional comparator. When the desired signal ratio between amplifier 24 and 32 is detected the exposure of film 4 is terminated.

As an alternative to the above-described electronics the amplified output signal from amplifier 24 can be applied to an integrator 34 to generate an integrated signal that is applied to control circuit 26 which comprises a comparator. A reference signal from a potentiometer 36 is also applied to the comparator. The latter deactivates the power source 28 for light 14 when the two signals have a predetermined relative value, e.g. when the voltage of the two signals is equal. Although the integrated photo-sensor output signal is not a signal that is a direct function of the light intensity, the speed with which or the time interval in which the integrated signal reaches a predetermined value is a function of and varies with the change in the light transmissivity of the copy film. Accordingly, in this embodiment of the invention the change in the transmissivity is again employed to control and terminate exposure. However, the supporting circuitry is less complicated and sensitive, is somewhat more economical to build than the earlier discussed electronics and, therefore, may be preferred for certain applications.

In this arrangement fluctuations in the light intensity have no effect on the exposure cycle since the ratio between the output signals of the two sensors is instantaneously determined without holding one of the signals over the full length of the exposure cycle.

I claim:

1. A method for controlling the exposure of film to light comprising the steps of providing a light transmitting film carrier including a light transmitting substance having a light transmissivity which changes as a function of the total light energy to which the substance is exposed; exposing the film by directing light through the film from one side thereof to thereby change the light transmissivity of the substance; sensing the intensity of light traversing the film; as the film is being exposed determining the change in the light transmissivity of the substance from the intensity of light sensed; and terminating the exposing step after and in response to a predetermined change in the light transmissivity of the substance; whereby substantially identical film exposures are obtained irrespective of changes in the quantity or quality of light directed onto the side of the film by correspondingly increasing or decreasing the length of the exposure step until the predetermined change in the light transmissivity has been attained.

2. A method according to claim 1 wherein the film comprises vesicular film having a film base and a thin plastic coating carried by the base and including diazonium salt; and wherein the terminating step includes the step of terminating the light exposure after a predetermined increase in the light transmissivity of the vesicular film.

3. A method according to claim 2 wherein the step of discontinuing comprises the step of discontinuing the light exposure after the film transmissivity has increased a plurality of times over the light transmissivity of the film in its unexposed state.

4. A method according to claim 1 including the step of determining the peak spectral sensitivity range for the film; and limiting the step of determining the change in the light transmissivity to substantially the peak sensitivity range of the film.

5. A method according to claim 1 wherein the step of determining the change in the light transmissivity comprises the steps of forming an output signal as a function of the intensity of light transmitted through the film, forming a reference signal, and determining the ratio between the output signal and the reference signal, and wherein the step of terminating comprises the step of terminating when the ratio between the output signal and the reference signal has a predetermined value.

6. A method according to claim 5 including the step of adjusting the reference signal for fluctuation in the intensity of light reaching the film.

7. A method according to claim 5 wherein the step of forming the reference signal comprises the step of continually sensing the intensity of light reaching the film, forming a second output signal as a function of the intensity of such light, and determining said ratio from the first and second output signals.

8. A system for controlling the exposure of light sensitive film so that the relative light density of images on the film remains constant irrespective of variations in the quality or quantity of light to which the film is exposed or variations in the relative light transmissivity of a light sensitive substance of the film, the substance substantially instantaneously changing its light transmissivity as a function of its exposure to light, the system comprising: a light source; means for positioning the film so that light from the source exposes the film; a light sensor positioned on the side of the film opposite from the light source for sensing the intensity of light being transmitted by the film; and means operatively coupled with the sensor for terminating the exposure of the film to light from the source after and in response to a predetermined change in the sensed light intensity and, thereby, in the light transmissivity of the film; whereby the exposure of the film is carried out, controlled and terminated as a function of the change in the light transmissivity of the film induced by light from the source.

9. A system according to claim 8 wherein the light sensor generates an output signal which is a linear function of the intensity of the light striking the sensor.

10. A system according to claim 9 including means positioning a master film having images thereon in intimate contact with the film for contact printing the images on the film.

11. A system according to claim 10 further including a substantially transparent light control area at a predetermined location on the master; and wherein the sensor is positioned opposite the control area to prevent an image on the master from affecting the intensity of light sensed by the light sensor.

12. A system according to claim 8 wherein the film comprises vesicular film.

13. A system according to claim 12 including control means for signaling the exposure terminating means to terminate the light exposure of the film when the sensed light intensity and, thereby, the light transmissivity of the film has increased by a factor of at least about two over its lowest previously measured value.

14. A system according to claim 8 wherein the terminating means comprises means for continuously forming a reference signal which is a function of the intensity of light emitted by the source, and means for determining the ratio between a reference signal and the instantaneous output signal, and wherein the terminating means terminates the film exposure when the ratio has reached a predetermined value.

15. A system according to claim 14 wherein the last mentioned means comprises a second light sensor positioned in the direct path of light from the source.

16. A system according to claim 15 wherein the terminating means includes means for directly comparing the output signal with a reference signal, and means for terminating the film exposure when the output signal and the reference signal have reached a predetermined relative value.

17. A system according to claim 15 including means for integrating the output signal to generate an integrated signal; and wherein the terminating means comprises means for generating a reference signal, means for comparing the integrated signal with the reference signal, and means for terminating the film exposure when the integrated signal and the reference signal have reached predetermined relative values.

18. A system according to claim 17 including means for varying the reference signal.

19. A system according to claim 18 wherein the varying means comprises a potentiometer.

20. A system for controlling the exposure of light sensitive film, so that the relative light density of images on the film remains constant irrespective of variations in the quality or quantity of light to which the film is exposed or variations in the relative light transmissivity of a light sensitive substance of the film, the substance substantially instantaneously changing its light transmissivity as a function of its exposure to light, the system comprising: a light source, means for positioning the film so that light from the source exposes the film; a first light sensor positioned on the side of the film opposite from the light source for sensing the intensity of light being transmitted by the film; means for continuously forming a reference signal which is a function of the intensity of light emitted by the source; and means operatively coupled with the sensor and the reference signal forming means for terminating the exposure of the film to light from the source when a ratio between the reference signal and the output signal generated by the light sensor has reached a predetermined value; whereby the exposure of the film is carried out, controlled and terminated as a function of the change in the light transmissivity of the film.

* * * * *